(12) United States Patent
Partee et al.

(10) Patent No.: US 8,243,398 B2
(45) Date of Patent: Aug. 14, 2012

(54) HYBRID TRACKWIDTH READ ELEMENT

(75) Inventors: Charles C. Partee, Lyons, CO (US); John P. Nibarger, Superior, CO (US)

(73) Assignee: Oracle America, Inc., Redwood City, CA (US)

( * ) Notice: Subject to any disclaimer, the term of this patent is extended or adjusted under 35 U.S.C. 154(b) by 925 days.

(21) Appl. No.: 12/141,509

(22) Filed: Jun. 18, 2008

(65) Prior Publication Data

US 2009/0316309 A1 Dec. 24, 2009

(51) Int. Cl.
*G11B 5/39* (2006.01)

(52) U.S. Cl. .................. 360/314; 360/322; 360/324.12; 360/324.2; 360/327.31

(58) Field of Classification Search .............. 360/324.1, 360/324.11, 324.12, 324.2, 322, 314, 315, 360/316, 327, 327.3, 327.31
See application file for complete search history.

(56) References Cited

U.S. PATENT DOCUMENTS

| | | | | |
|---|---|---|---|---|
| 3,967,368 A | * | 7/1976 | Brock et al. | 29/603.14 |
| 4,851,944 A | * | 7/1989 | Mowry | 360/327 |
| 5,107,385 A | * | 4/1992 | Kelley | 360/322 |
| 5,331,492 A | * | 7/1994 | Komai et al. | 360/322 |
| 7,106,544 B2 | * | 9/2006 | Dugas et al. | 360/75 |
| 7,133,264 B2 | * | 11/2006 | Mauri et al. | 360/324.11 |
| 2005/0128654 A1 | * | 6/2005 | Sapozhnikov | 360/324.12 |
| 2007/0285838 A1 | * | 12/2007 | Hennecken et al. | 360/129 |

* cited by examiner

*Primary Examiner* — Jefferson Evans

(74) *Attorney, Agent, or Firm* — Brooks Kushman P.C.

(57) ABSTRACT

A magneto-resistive (MR) device for reading at least one of a legacy data and a present data magnetically recorded on at least one legacy track and a least one present track, respectively, is provided. The device comprises first and second MR elements, and first, second, and third permanent magnets. The first MR read element is positioned between the first and the second permanent magnets to stabilize the first MR read element while reading the legacy data from the media. The second MR element is positioned adjacent to the second permanent magnet and configured to read the present data from the media. The third permanent magnet is positioned adjacent to the second MR element and opposite to the second permanent magnet. The second and the third permanent magnets cooperate with each other to stabilize the second MR read element while reading the present data from the media.

20 Claims, 2 Drawing Sheets

HYBRID TRACKWIDTH READ ELEMENT

BACKGROUND

1. Technical Field

The embodiments of the present invention generally relate to a hybrid trackwidth read element.

2. Background Art

Driven by a continuing demand for ever-increasing amounts of information storage in an ever-decreasing volume, there is an ongoing trend to reduce dimensions in nearly all magnetic recording systems. Included in this trend is the width of the data track. Therefore, data tracks that were recorded at one time in a given older system (referred to herein as legacy data) are generally wider than data tracks that are recorded at a later time in newer systems (referred to herein as present data). Yet, at times, it may be necessary to read legacy data from similar media tape, floppy disk, rigid disk, or magnetic strip (e.g., such as on a credit card) based families. Legacy data may be stored on media along with present data. By design, the magnetic media forms regions of magnetization that are generally of similar magnetization orientation. A magnetic transition is formed when these regions have generally opposing magnetization directions to each other. The legacy data and present data are generally stored on the media as magnetic transitions spaced from each other by varying distances. Legacy data, in general, is written at a different trackwidth on the media than that of present data. Often times, the trackwidth of the legacy data on the media is greater than the trackwidth of present data.

Due to such a condition, data readers for reading present data on the media are generally configured to read such data at a narrow trackwidth as opposed to the trackwidth needed to read legacy data. In the event the trackwidth that is preferred for reading the present data is too narrow, such a condition may present a signal-to-noise issue while reading legacy data as the present data reader may not be able to sample enough of the media. As noted above, the media may be a mixture of isolated (e.g., not exchange coupled) particles and comprise legacy data. The particulate nature of the magnetic media is desired to increase the signal-to-noise ratio. To compensate for the potential signal-to-noise issues with a present data reader that is not able to sample enough of the media, a legacy data reader may be added to a media read device that is configured to read the legacy data at greater trackwidths. The media read device may also include a present data reader to read the present data from the media at narrow trackwidths. Such an implementation generally incurs significant cost for the media read device.

SUMMARY

In one embodiment, a magneto-resistive (MR) device for reading at least one of a legacy data and a present data magnetically recorded on at least one legacy track and a least one present track, respectively, is provided. The device comprises first and second MR elements, and first, second, and third permanent magnets. The first MR read element is positioned between the first and the second permanent magnets to stabilize the first MR read element while reading the legacy data from the media. The second MR element is positioned adjacent to the second permanent magnet and configured to read the present data from the media. The third permanent magnet is positioned adjacent to the second MR element and opposite to the second permanent magnet. The second and the third permanent magnets cooperate with each other to stabilize the second MR read element while reading the present data from the media.

In another embodiment, a method for reading at least one of a legacy data and a present data signal magnetically recorded on at least one legacy track and a least one present track, respectively, on magnetic media is provided. The method comprises reading the legacy data from the media with a first MR read element. The method further comprises positioning the first MR read element between first and second permanent magnets so that the first and second permanent magnets stabilize the first MR read element while reading legacy data from the media. The method further comprises reading the present data with a second MR read element. The method further comprises positioning the second MR read element adjacent to the second permanent magnet. The method further comprises positioning a third permanent magnet adjacent to the second MR read element and opposite to the second permanent magnet such that the second and the third permanent magnets cooperate with each other to stabilize the second MR read element while reading the present data from the media.

In another embodiment, a magneto-resistive (MR) device for reading at least one of a legacy data and a present data magnetically recorded on at least one legacy track and a least one present track is provided. The device comprises first and second MR read elements, at least one first permanent magnet, and at least one second permanent magnet. The first MR read element includes a first set of characteristics and is configured to read the legacy data from the media. The at least one first permanent magnet is positioned about the first MR read element to stabilize the first MR read element while reading the legacy data from the media. The second MR read element includes a second set of characteristics that is different from the first set of characteristics of the first MR read element. The second MR read element is positioned adjacent to the at least one first permanent magnet and is configured to read the present data from the media. The at least one second permanent magnet is positioned adjacent to the second MR read element and opposite to the at least one first permanent magnet such that the at least one first permanent magnet and the at least one second permanent magnets cooperate with each other to stabilize the second MR read element while reading the present data from the media.

BRIEF DESCRIPTION OF THE DRAWINGS

The embodiments of the present invention are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein. However, it is to be understood that the disclosed embodiments are merely exemplary of the invention that may be embodied in various and alternative forms.

The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
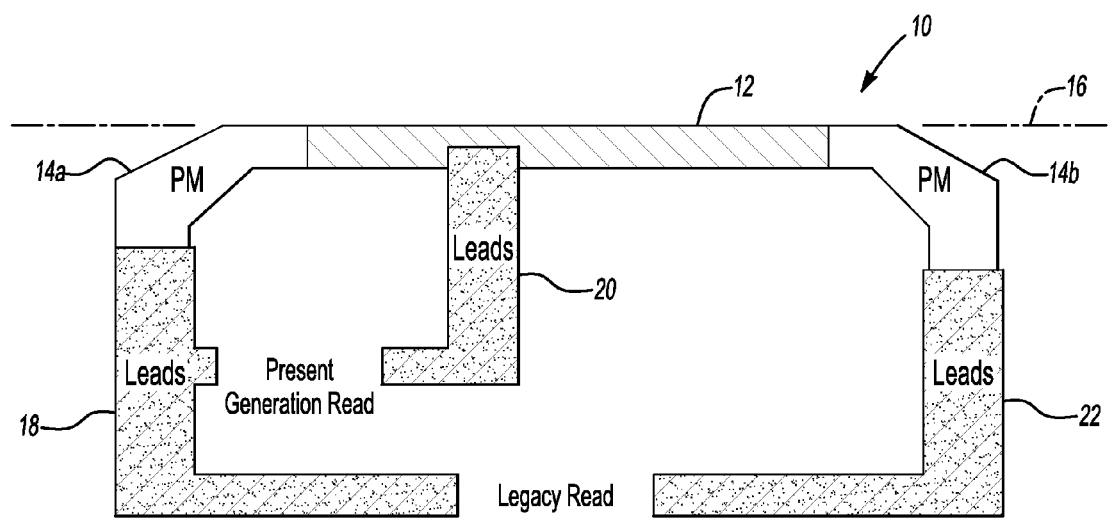
FIG. 1 depicts a center-tap media read device.

Referring now to FIG. 1, a conventional center-tap media read device 10 is shown. The device 10 includes a reader 12 and a pair of permanent magnets 14a, 14b. The reader 12 is generally implemented as a magnetoresistive (MR) read element. Media (or tape) 16 having data which may be in the form of magnetic particles is stored thereon. Media 16 is traveling in a plane perpendicular to the reader 12 (e.g., into and out of the page).

The tape 16 is positioned about the reader 12 and the permanent magnets 14a and 14b. A first lead 18 is coupled to the permanent magnet 14a. A second lead 20 is coupled to the reader 12. A third lead 22 is coupled to the permanent magnet 14b. The reader 12 is configured to read magnetically recorded data from the tape 16. To read legacy data, from the tape 16, the leads 18 and 22 are electrically coupled together such that, in one embodiment, a fixed current passes through reader 12, the pair of permanent magnets 14a and 14b and through the leads 18 and 22. In general, the MR element 12 changes resistance in response to the magnetic data stored on the tape 16 thereby varying voltage in which the varying voltage is indicative of the data stream on the tape 16. The permanent magnets 14a and 14b are generally configured to stabilize the MR element 12. For example, the permanent magnets 14a and 14b are magnetically coupled to the MR read element 12 and apply a fixed field thereby properly aligning the MR read element 12 and ensuring that the MR read element 12 maintains a desired magnetization configuration. The configuration provided when reading legacy data generally provides for a stable response from the MR read element 12 since both sides of the MR read element 12 are magnetically coupled to the permanent magnets 14a and 14b due to the coupling of the leads 18 and 22 together.

To read present data stored on the tape 16, the leads 18 and 20 are electrically coupled together such that current passes through the reader 12, the permanent magnet 14a and the leads 18 and 20. Again, the voltage may vary based on the change of resistance exhibited by the MR read element 12 whereby the varying voltage may be indicative of the present data on the tape 12. Although the entire MR element 12 responds to the tape 16 by changing its resistance, the varying voltage that is indicative of the magnetization of the media is only induced in an "active region" of the MR read element 12. The active region of the MR read element 12 is the region disposed between the leads 18 and 20. By coupling the leads 18 and 20 together to obtain the present data from the tape 16, such a condition may leave the active region of the MR read element 12 in a less stable state. By magnetically coupling a single permanent magnet 14a to the MR read element 12 via the leads 18 and 20, the permanent magnet structure may be in an asymmetric state with respect to the MR read element 12. Such a condition may lead to Barkhausen noise issues. Due to the exchange coupled nature of the MR read element 12, an additional noise source is associated with the adjacent MR material between leads 20 and 22. This could occur through the changing magnetic orientation of the adjacent MR material between leads 20 and 22 being exchange coupled to the portion of the MR read element 12 between leads 18 and 20 causing unwanted signal degradation while reading present data.

Figure 2:
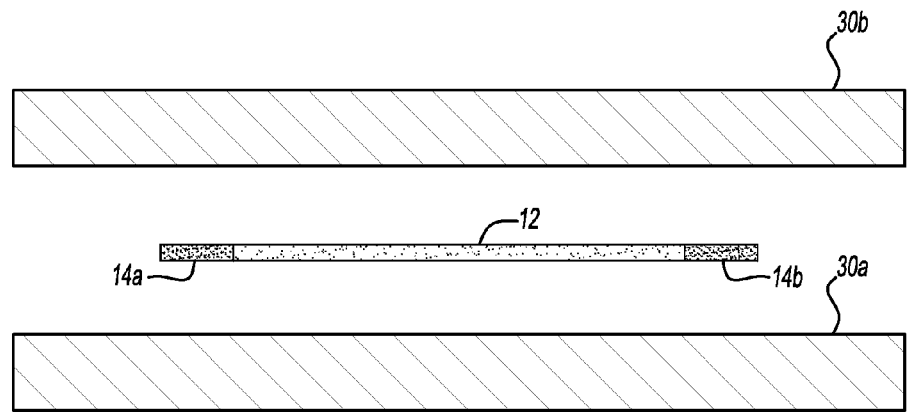
FIG. 2 depicts a top view of the center-tap media read device of FIG. 1.

Referring now to FIG. 2, a top view of the center-tap media read-device 10 is shown. The implementation as shown in FIG. 2 generally represents an air bearing surface (ABS) in contact with magnetic media. A pair of shields 30a-30b are positioned about the MR read element 12 and the permanent magnets 14a, 14b. The MR read element 12 may be implemented on a giant magneto-resistive (GMR) read element, an anisotropic magneto-resistive (AMR) read element or a tunneling magneto-resistive (TMR) read element. In the event the MR read element 12 is implemented as a TMR read element, the shields 30a-30b are generally configured to act as electrical leads for the MR read element 12. In general, the implementation depicted in FIG. 2 is for a current-in-plane ARM or GMR read element. The media (or tape) 16 while not shown in FIG. 2, generally travels over the MR read element 12, the permanent magnets 14a-14b, and over the shields 30a-30b (i.e., the tape travels from the bottom of the page to the top of the page).

Figure 3:
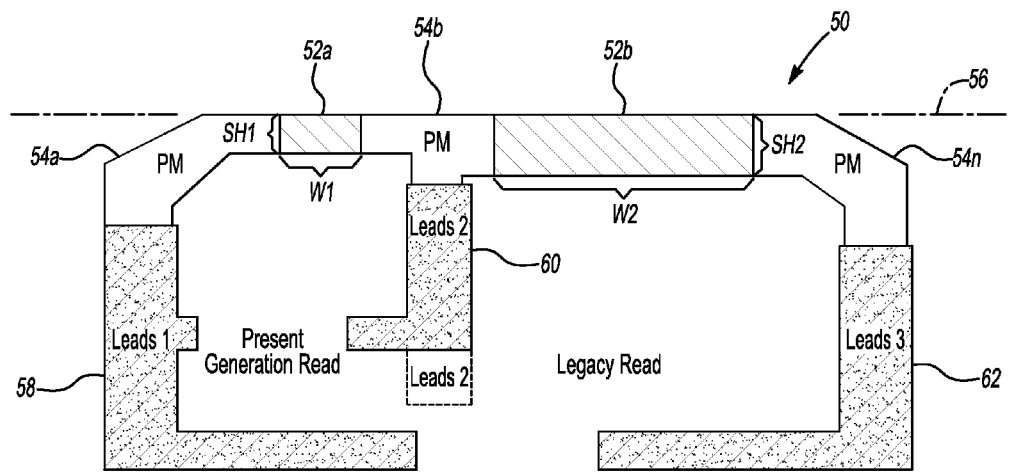
FIG. 3 depicts a hybrid read device in accordance to one embodiment of the present invention.

Referring now to FIG. 3, a hybrid read device 50 in accordance to one embodiment of the present invention is shown. The device 50 includes first and second readers 52a and 52b, respectively and a plurality of permanent magnets 54a-54n. The readers 52a and 52b are generally implemented as (MR) read elements. It is generally contemplated that MR read elements 52a and 52b may be, but not limited to, a GMR read element, an AMR read element, or a TMR read element. In the event the MR read elements 52a and 52b are implemented as TMR read elements, the various leads used to couple the read elements may function as shields to protect the read elements.

Media (tape or disc) 56 having data in the form of magnetic properties are stored thereon. The media 56 is positioned about the MR read elements 52a and 52n and the permanent magnets 54a-54n. The MR read elements 52a and 52n and the permanent magnets 54a-54n may contact the media 56 or be separated from the media 56 by an air bearing surface (ABS) (not shown). A first lead 58 is coupled to the permanent magnet 54a. A second lead 60 is coupled to the permanent magnet 54b. A third lead 62 is coupled to the permanent magnet 54n.

In general, the MR read element 52a is generally configured to read present data from the media 56. The MR read element 52b is generally configured to read legacy data from the media 56. In contrast to the device 10 of FIG. 1, each MR read element 52a and 52b includes a permanent magnet on each side thereby providing for a symmetric stabilization of both ends of the MR read elements 52a and 52b irrespective of whether legacy data or present data is being read.

For example, to read present data from the tape 56, leads 58 and 60 may be electrically coupled such that any varying voltage generated by the MR read element 52a is passed through the permanent magnets 54a and 54b and the leads 58 and 60. The varying voltage is generally indicative of the data stored on the media 56 based on recent or current generation recording methods. The permanent magnets 54a and 54b stabilize the MR read element 52a. To read legacy data from the tape 56, leads 60 and 62 may be electrically coupled such that any current generated by the MR read element 52b is passed through the permanent magnets 54b and 54n and the leads 60 and 62. The varying voltage is generally indicative of the data stored on the media 56 in accordance to older or legacy generation recording methods. The permanent magnets 54b and 54n stabilize the MR read element 52n. In such a configuration, each MR read element 52a and 52b is stabilized due to the presence of the permanent magnets 54a-54n on each side of the each MR read element 52a and 52b.

Figure 4:
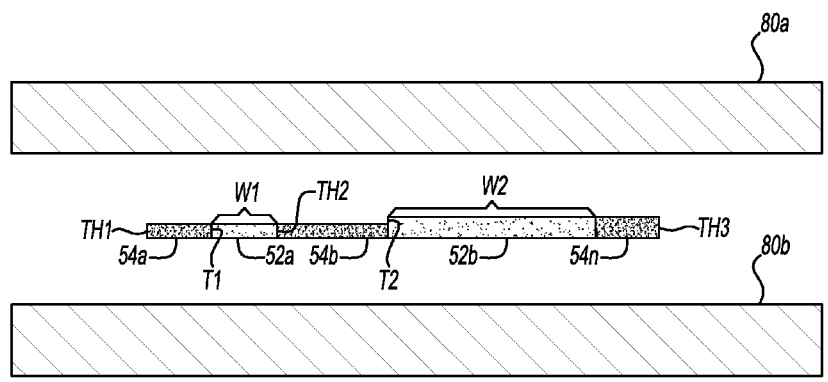
FIG. 4 depicts a top view of the hybrid read device of FIG. 3.

The permanent magnets 54a-54n may be made of an alloy of cobalt (Co), chromium (Cr) and platinum (Pt). The permanent magnets 42a-54n may each have a magnetization of 460 emu/cm$^3$. Each permanent magnet 54a-54n may have a different or similar thickness (e.g., TH1, TH2, and TH3) from one another as shown in FIG. 4. The thicknesses for each permanent magnet 54a-54b may be between 30 nm to 80 nm. The thickness for each permanent magnet 54a-54n may vary based on the desired criteria of a particular implementation. In general, thinner permanent magnets provide less stabilization, but allow for greater signal (e.g., a signal to noise ratio (SNR) which is derived from a greater signal but also greater noise) from the MR read element 52a or 52b. Thick permanent magnets on the other hand, generally provide for increased stabilization, but reduce the signal (e.g., a signal to noise ratio (SNR) which is derived from smaller signal, but also smaller noise) from the MR read element 52a or 52b. In general, the thickness of the permanent magnets 54a-54n are arranged to provide the maximum SNR while maintaining the minimum required level of stability to stabilize the MR read elements 52a-52b. By enabling the MR read element 52a-52b to be magnetically coupled to the permanent magnets 54a-54n that include similar or different thicknesses from one another, the stability and SNR of each MR read element 52a-52b can be independently optimized. Such a condition allows for greater control in constructing the hybrid media read device 50. In contrast, for the MR read element 12 as noted in connection with FIGS. 1-2, the thickness of the permanent magnets 14a and 14b is generally a compromise and may not be optimal for present generation and/or legacy data readback. A particular thickness that is selected for the permanent magnets 14a and 14b to optimize present data readback may not be optimal for legacy data readback. Likewise, a particular thickness that is selected for the permanent magnets 14a and 14b to optimize legacy data readback may not be optimal for present data readback.

Because a wider MR element generally produces more signal, each MR read element 52a and 52b may have different widths in order to optimize the signal to noise for the legacy and the present generation read as shown in FIGS. 3-4 (e.g., see W1 and W2). The width for each MR read element 52a and 52b may vary between 0.25 to 10 microns. Each MR read element 52a and 52b may also have different stripe heights from each other. Such a condition is generally shown in FIG. 3 (see SH1 and SH2). It is also contemplated that the stripe height for each MR read element 52a-52b may be equal to each other. The stripe height is generally defined as the vertical height of each MR read element 52a and 52b as shown in reference to FIG. 3. The stripe height for each MR read element 52a-52n may be between 0.15-1.8microns.

As is shown in FIG. 4, the MR read elements 52a and 52b may be arranged to include different or similar thicknesses from one another (see T1 and T2). The thickness of each MR read element 52a and 52b in reference to FIG. 4 is generally the vertical height (which is the same as the deposition thickness of the film during manufacture) of the MR read element 52a and 52b. In general, the thickness of each MR read element 52a and 52b may be between 200-1000 Angstroms. The particular thickness of each MR read element 52a-52n may vary based on the particular criteria of a given implementation.

Each MR read element 52a-52b generally includes an active sensing layer that rotates in the presence of an externally applied field from the magnetic media 56. The thickness of the active sensing layer is between 20 and 400 Angstroms of $Ni_{80}Fe_{20}$ effective thickness. The thickness of $Ni_{80}Fe_{20}$ generally corresponds to a magnetization-thickness product (or Mrt) between 1.6 mA and 32 mA for each MR read element 52a-52b. The magnetization-thickness product for each MR read element 52a-52b may be similar to one another or different from one another.

The MR read elements 52a-52b may also each be arranged to include different or similar materials from one another, or different or similar sensing mechanisms from one another (e.g., AMR, GMR, or TMR). An AMR read element is generally comprised of a seed layer which is typically Ta; a soft adjacent layer, which is typically a magnetically soft alloy such as $Co_{90}Zr_5Mo_5$; a non-magnetic spacer layer that may be comprised of Ta; and an active magnetic read layer that may be comprised of $Ni_{80}Fe_{20}$. A GMR read element is generally comprised of a seed layer that may be comprised of Ta or NiFeCr; an antiferromagnetic layer that may be comprised of a Mn-based antiferromagnet such as $Pt_{49}Mn_{51}$ or $Ir_{20}Mn_{80}$; a pinned layer, that may be comprised of $Co_{90}Fe_{10}$ or $(Co_{90}Fe_{10})_{80}B_{20}$; a material providing antiferromagnetic coupling such as Ru; a reference layer that may be comprised of $Co_{90}Fe_{10}$ or $(Co_{90}Fe_{10})_{80}B_{20}$; a non-magnetic spacer layer that may be comprised of Cu; a free layer that may include a bilayer material of $Co_{90}Fe_{10}$ or $(Co_{90}Fe_{10})_{80}B_{20}$ and $Ni_{80}Fe_{20}$. A TMR read element may be identical to the GMR structure, but may remove the Cu layer and replace such a layer with an alumina ($AlO_x$) or MgO insulating layer. By independently controlling the stripe height, widths, thickness, magnetization-thickness product, materials, and/or sensing mechanism for each MR read element 52a and 52b, such control may provide for optional performance for the MR read element 52a while reading present data and for the MR read element 52b while reading legacy data.

FIG. 4 further illustrates that a pair of shields 80a and 80b may be positioned about the MR read elements 52a and 52b and the permanent magnets 14a and 14b. The shields 80a and 80b may block magnetic flux from neighboring tracks and up and downstream magnetic bits on the media 56 which enable improved resolution of the MR read elements 52a and 52b.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A magneto-resistive (MR) device for reading at least one of a legacy data and a present data magnetically recorded on at least one legacy track and a least one present track, respectively, on magnetic media, the device comprising:
    a first MR read element configured to read the legacy data from the media;
    first and second permanent magnets for positioning the first MR read element therebetween to stabilize the first MR read element while reading the legacy data from the media;
    a second MR read element positioned adjacent to the second permanent magnet and configured to read the present data from the media; and
    a third permanent magnet positioned adjacent to the second MR read element and opposite to the second permanent magnet such that the second and the third permanent magnets cooperate with one another to stabilize the second MR read element while reading the present data from the media;
    wherein the at least one legacy track is arranged to a width that is greater than a width of the at least one present track.

2. The device of claim 1 wherein the first MR read element includes one of a giant magneto-resistive (GMR) read element, an anisotropic magneto-resistive (AMR) read element, and a tunneling magneto-resistive (TMR) read element.

3. The device of claim 1 wherein the second MR read element includes one of a (GMR) read element, an (AMR) read element, and a tunneling magneto-resistive (TMR) read element.

4. The device of claim 1 wherein a stripe height for each of the first and the second MR read elements is between the range of 0.15-1.8 microns.

5. The device of claim 1 wherein a stripe height for the first MR read element is different than a stripe height of the second MR read element.

6. The device of claim 1 wherein a magnetization-thickness product for each of the first and the second MR read elements is between the range of 1.6-32 mA.

7. The device of claim 1 wherein a magnetization-thickness product of the first MR read element is different than a magnetization-thickness product of the second MR read element.

8. The device of claim 1 wherein each of the first, second and third permanent magnets and the first and second MR read elements contact the media.

9. The device of claim 1 wherein an air bearing surface (ABS) separates the first, second and third permanent magnets and the first and second MR read elements from the media.

10. The device of claim 1 wherein a thickness for the first, second, and third permanent magnets is between the range of 30 nm and 80 nm.

11. The device of claim 1 wherein a thickness for each of the first, second, and third permanent magnets is different from one another.

12. A method for reading at least one of a legacy data and a present data magnetically recorded on at least one legacy track and a least one present track, respectively, on magnetic media, the method comprising:
    reading the legacy data from the media with a first MR read element;
    positioning the first MR read element between first and second permanent magnets so that the first and second permanent magnets stabilize the first MR read element while reading legacy data from the media;
    reading the present data with a second MR read element;
    positioning the second MR read element adjacent to the second permanent; and
    positioning a third permanent magnet adjacent to the second MR read element and opposite to the second permanent magnet such that the second and the third permanent magnets cooperate with each other to stabilize the second MR read element while reading the present data from the media;
    wherein the at least one legacy track is arranged to a width that is greater than a width of the at least one present track.

13. The method of claim 12 wherein a stripe height for each of the first and the second MR read elements is between the range of 0.15-1.8 microns.

14. The method of claim 12 wherein a stripe height for the first MR read element is different than a stripe height of the second MR read element.

15. The method of claim 12 wherein a magnetization-thickness product for each of the first and the second MR read elements is between the range of 1.6-32 mA.

16. The method of claim 12 wherein a magnetization-thickness product of the first MR read element is different than a magnetization-thickness product of the second MR read element.

17. The method of claim 12 wherein a width of the first MR read element is different than a width of the second MR read element.

18. A magneto-resistive (MR) device for reading at least one of a legacy data and a present data magnetically recorded on at least one legacy track and a least one present track, the device comprising:
    a first MR read element including a first set of characteristics configured to read the legacy data from the media;
    at least one first permanent magnet positioned about the first MR read element to stabilize the first MR read element while reading the legacy data from the media;
    a second MR read element including a second set of characteristics that is different from the first set of characteristics of the first MR read element, wherein the second MR read element is positioned adjacent to the at least one first permanent magnet and is configured to read the present data from the media; and
    at least one second permanent magnet positioned adjacent to the second MR read element and opposite to the at least one first permanent magnet such that the at least one first permanent magnet and the at least one second permanent magnet cooperate with one another to stabilize the second MR read element while reading the present data from the media
    wherein the at least one present track is arranged to a width that is less than a width of the at least one legacy track.

19. The device of claim 18 wherein the first set of characteristics include at least one of a magnetization-thickness product of the first MR read element; a stripe height of the first MR read element; a width of the first MR read element; and a particular type of the first MR read element including at least one of a (GMR) read element, an (AMR) read element, and a tunneling magneto-resistive (TMR) read element.

20. The device of claim 19 wherein the second set of characteristics include at least one of a magnetization-thickness product of the second MR read element; a stripe height of the second MR read element; a width of the second MR read element and a particular type of the second MR read element including at least one of a (GMR) read element, an (AMR) read element, and a tunneling magneto-resistive (TMR) read element.

* * * * *

UNITED STATES PATENT AND TRADEMARK OFFICE
CERTIFICATE OF CORRECTION

| | | |
|---|---|---|
| PATENT NO. | : 8,243,398 B2 | Page 1 of 1 |
| APPLICATION NO. | : 12/141509 | |
| DATED | : August 14, 2012 | |
| INVENTOR(S) | : Charles C. Partee et al. | |

It is certified that error appears in the above-identified patent and that said Letters Patent is hereby corrected as shown below:

Column 7, Lines 47 and 48, Claim 12:

After "adjacent to the second permanent"
insert -- magnet --.

Column 8, Line 38, Claim 18:

After "the present data from the media"
insert -- ; --.

Signed and Sealed this
Thirteenth Day of November, 2012

David J. Kappos
*Director of the United States Patent and Trademark Office*